United States Patent Office 2,813,704
Patented Nov. 19, 1957

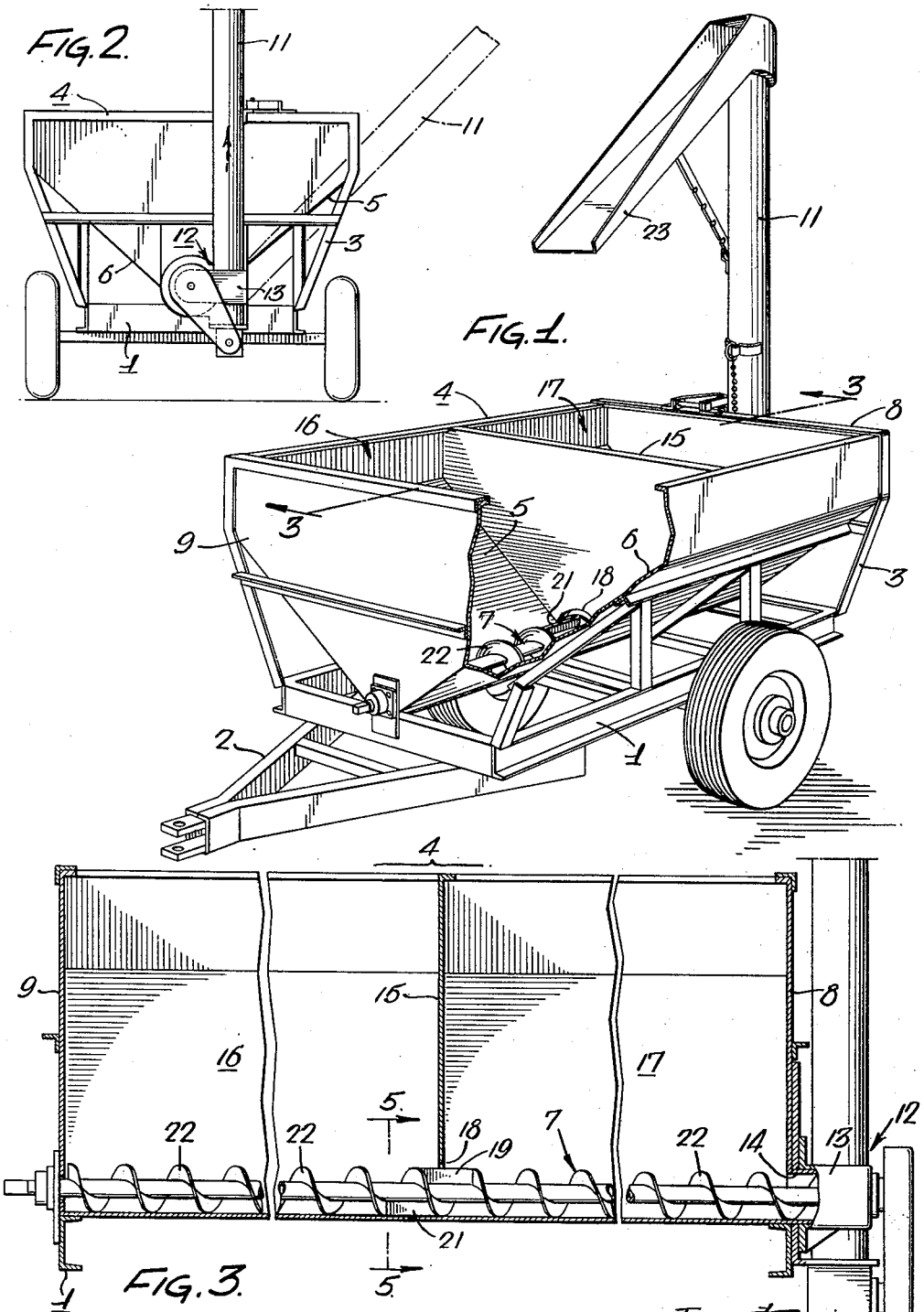

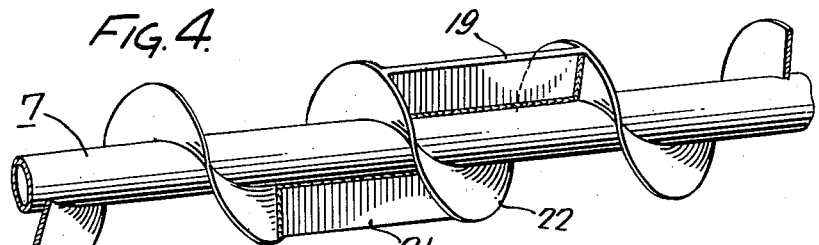
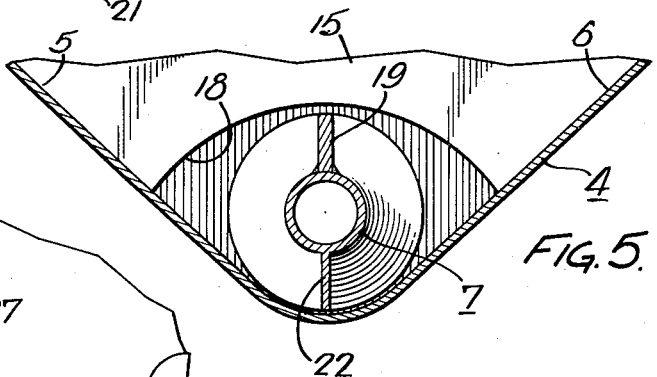
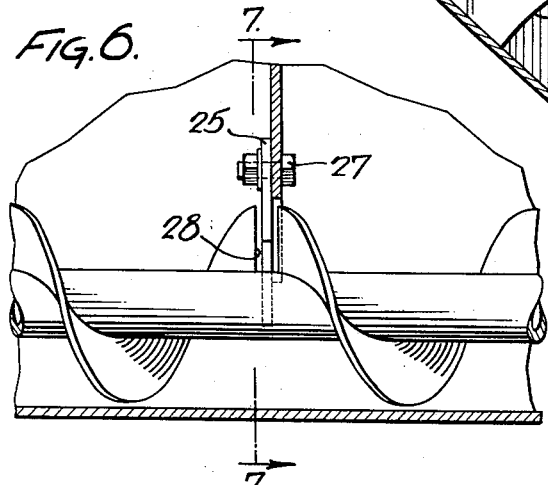
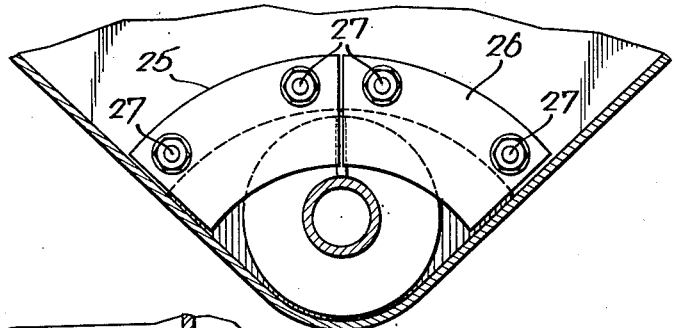
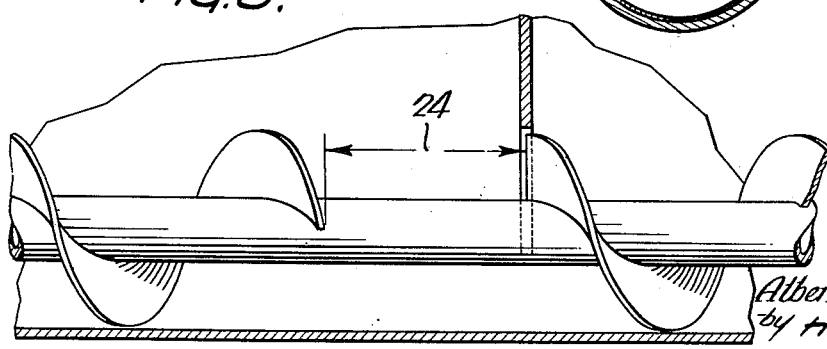

2,813,704

FEED TRANSPORT MIXER

Albert E. MacKissic, Parker Ford, Pa.

Application September 13, 1954, Serial No. 455,587

11 Claims. (Cl. 259—9)

This invention relates to improvements in self-unloading feed transport and mixing apparatus and a principal object of the invention is to provide apparatus of this class having improved mixing characteristics.

More specifically, an object of the invention is to provide a transport-mixer of the stated type comprising a wheeled vehicle having a hopper body and mechanism for unloading which functions also to mix the several ingredients of a mixed feed emptied at random into the hopper more rapidly and thoroughly than has been possible with the mixing devices of the prior art.

Another object of the invention is to provide a hopper body having an internal partitioning member provided with an opening which member and opening cooperate with an open screw conveyor or auger passing through said opening and also with re-circulating devices to afford efficiently, expeditiously and economically a thorough mixing of said ingredients.

In the illustrated drawing:

Fig. 1 is a view in perspective of a mixer-transport made in accordance with the invention;

Fig. 2 is a rear elevational view of the mixer-transport;

Fig. 3 is a sectional view on the line 3—3, Fig. 1;

Fig. 4 is a fragmentary view in perspective of the conveyor screw constituting an element of the apparatus;

Fig. 5 is a sectional view on the line 5—5, Fig. 3;

Fig. 6 is a fragmentary sectional view illustrating a modification within the scope of the invention;

Fig. 7 is a sectional view on line 7—7, Fig. 6; and

Fig. 8 is a view similar to Fig. 6 showing a further modification.

With reference to the drawings, a transport-mixer made in accordance with my invention may comprise the usual wheeled chassis 1 having a draft extension 2 at its forward end for attachment of the chassis to the draw bar of a tractor. Supported in a suitable frame 3 on the chassis is a hopper body 4, the underpart of which is generally V-shaped in transverse section. Journalled in the bottom of the hopper at the juncture of the inclined walls 5 and 6 is an open screw conveyor or auger 7 which extends the full length of the hopper and through the rear wall 8 for a purpose hereinafter described. The screw shaft projects through the front wall 9 of the hopper and provides means for attachment of the shaft to the power take-off of the aforesaid tractor thus providing for operation of the conveyor in conventional manner.

At the rear of the body and mounted on the latter for adjustment about a horizontal axis between vertical and horizontal positions is a discharge duct 11 which in the present instance contains a screw conveyor of the same general character as the screw conveyor 7, said first mentioned screw conveyor and duct forming the means for unloading the contents of the hopper body 4 in a desired location. This first mentioned screw conveyor, not shown, is operatively connected at the lower or inner end of the duct 11 to the shaft of the screw conveyor 7, so as to be operative from the power take-off of the tractor by way of the last-named screw conveyor 7.

A suitable casing 12 is provided at the lower end of the duct which forms a secondary hopper 13 for receiving materials discharged from the hopper body 4 by the screw conveyor 7 by way of the rear discharge port 14 in the wall 8 into which as previously described the rear end of the open screw-conveyor 7 extends. Materials discharged into the secondary hopper 13 are picked up by the screw conveyor in the discharge duct 11 and are conveyed to the outer end of that duct for ultimate discharge from the vehicle. The details of the discharge duct, its mounting on the chassis, and its mode of operation form no part of the present invention and may conform with devices of a like nature now available in the art.

In accordance with the invention, the interior of the hopper body 4 is divided by a partition 15 into two compartments, i. e., into a first or front compartment 16 and a second or rear compartment 17. The partition 15 has an opening 18 at the bottom thereof through which the screw conveyor 7 extends and which constitutes a discharge port through which said screw conveyor 7 may discharge materials from the bottom of the first or front compartment 16 to the second or rear compartment 17. Also in accordance with the invention, the open screw conveyor 7, in the section thereof immediately adjoining the partition 15 in the compartment 16, is provided with a vane or vanes, two in the present instance, designated respectively by the reference numerals 19 and 21. As illustrated in Figure 4, these vanes extend longitudinally of the shaft of screw conveyor 7 and radially outwardly from said shaft within the space between adjoining convolutions of the helical fin 22, which constitutes the active materials-moving element of the screw conveyor 7, and in the present instance, the vanes 19 and 21 extend from the periphery of the shaft of screw conveyor 7 to the outer periphery of the fin 22 so that each of said vanes forms a substantially complete block in the channel of the helix. The vanes 19 and 21 thereby interrupt and retard the normal movement of material along the helix and throw the material outward from the helix and upwardly along that side of partition 15 facing the first compartment 16, the effect, when the helix is covered by the work material and is rotated at normal speed, being one of pronounced agitation of the material in that area of the helix. The action of the vanes 19 and 21, however, does not entirely interrupt the feeding of the material through the port 18 although it retards the feeding rate. The material in the compartment 16 is thereby continuously moved into the compartment 17 and through the latter by action of the screw conveyor 7 to the discharge duct 11. During the mixing operation, this duct 11 will be maintained in an upright position and will have at its upper end a chute 23 which directs the material discharging from the upper end of the cylinder rearwardly into the rear compartment in which it gradually accumulates until the compartment 16 is empty.

The mixing operation is as follows:

The screw conveyor 7 is designed for operation at speeds up to 550 R. P. M., and the speed may be varied in accordance with the character of the work material. For poultry feed mixes, for example, a normal average speed of operation may be between 125 and 200 revolutions per minute. The diameter of the screw conveyor 7 is also a factor in determination of the appropriate speed of operation, and the normal average speed given above has been found satisfactory with a screw conveyor of approximately one inch shaft diameter, a radial fin of four inches outside diameter, and a helix pitch of four inches.

The ingredients of the feed mix may be dumped into the first compartment 16 indiscriminately with no attempt at premixing. This compartment may be partially or completely filled in accordance with the quantities required for any particular purpose. The screw conveyor 7 is then set in operation and tends to progressively transfer the feed materials from the first compartment 16 to the second compartment 17 by way of the port 18. The vanes 19 and 21, however, have the effect of retarding the rate of transfer by reducing the capacity of the screw conveyor 7 to feed the work material through the opening 18 in the partition 15. At the opening, in other words, the screw conveyor 7 will operate at a fraction of its normal capacity, say for example approximately 50%. As a result of this retardation in rate of feed at the partition, the screw conveyor 7 tends continuously to feed the work material from the first end to the rear of the forward compartment 16 at a rate materially in excess of the rate at which the material passes through the opening 18, and the material therefor tends continuously, in effect, to build up within said first compartment, the accumulated excess eventually working its way upwardly above opening 18 and along that side of said partition which faces compartment 16 and forwardly toward the front of the compartment 16. As a result of this circulation and the agitating effect of the screw conveyor 7, a highly efficient mixing action is set up in the first compartment 16 simultaneously with the transfer of a quantity of the feed mix to the second compartment 17, and this mixing action is maintained continuously until the compartment 16 is emptied. In the second compartment 17, which may be originally empty, the screw conveyor 7 tends to feed the material to the discharge duct 11 which, as described above, discharges the material back into the second compartment 17 and thereby sets up a circulation of the material through that compartment which affords a further pronounced mixing of the materials. Here also the operation is augmented by the normal mixing effect of the screw conveyor operating in duct 11.

By reason of the continued feeding of the material from the first to the second compartment, the latter compartment gradually fills with the mixed feed at the expense of the material in the forward compartment until eventually the entire mass of material, now thoroughly mixed, will be contained in the second compartment. The mixing operation, now complete, will be accomplished with a minimum expense of power and time and with greater thoroughness than has been possible with prior conventional mixing apparatus of this class. The mixed grain can now be unloaded at the desired points by way of the discharge duct 11 in conventional manner.

There may be some modification in both the mode of operation and in the structure of the transport mixer described above. It is apparent, for example, that instead of initiating the mixing operation in the first or forward compartment 16, the work materials may be initially deposited in the second or rear compartment 17. In this case, the discharge from the duct 11 will be directed to the first or forward compartment 16. The mixing effect of the vanes 19 and 21 in the first or forward compartment will be the same as described above and the feed retarding effect of the vanes will result in a gradual accumulation of the work material in the first or forward compartment 16. When the transfer of grain from the compartment 17 to the compartment 16 is completed, the materials now mixed together will be re-transferred to the first or forward compartment 16, a process effected either by disconnecting the conveyor screw in the discharge duct 11 from the screw in the hopper or by directing the discharge from said duct into the second or rear compartment 17. Obviously, this transfer operation will involve a further mixing of the materials.

An effect somewhat similar to that obtained by use of the vanes 19 and 21 described above may be had by the expedient of interrupting the helix or fin of the screw conveyor 7 in the first or forward compartment 16, in the neighborhood of the port 18. This interruption in the screw retards the rate of feed of said conveyor through the port 18 and results in a building up at the rear end of the first or forward compartment 16 and upwardly along that side of the partition facing said compartment 16, of an excess of the feed which eventually works its way forwardly at the top of the mass toward the front of the first or forward compartment 16. The aforedescribed mixing effect is obtained. In this case, however, the agitating effect of the vanes 19 and 21 is lacking. This interruption of the screw conveyor is illustrated in Fig. 8 of the drawings wherein the interruption is shown at 24.

A somewhat similar effect can be obtained by restricting the effective area of the port or opening 18 as illustrated in Figs. 6 and 7. This restriction of the port area below that required to accommodate the full feed capacity of the conveyor screw results again in the building up of an accumulated excess upwardly along that side of the partition facing said compartment 16 and the recirculatory mixing action previously described. The restriction is effected in the present instance by plates 25 and 26 secured to the partition by bolts 27 and overlapping the edges of the partition port 18. The screw fin is slotted at 28 to accommodate the plates. The effective size of the port may be varied by use of plates of differing sizes.

I claim:

1. In a transport-mixer, a hopper having in the bottom thereof a longitudinally extending open screw conveyor and a transverse partition dividing the interior of the hopper into first and second compartments, said partition having an opening therethrough accommodating said open screw conveyor and constituting a discharge port for transfer of materials by said conveyor from said first compartment to said second compartment, means adjacent said port for retarding said transfer through the port so that the rate thereof is materially lower than the normal feed capacity of said open screw conveyor, whereby the said conveyor tends continuously to build up material within said first compartment upwardly along that side of said partition facing said first compartment and above said port in said partition in excess of that passing through said port with consequent automatic recirculation of the accumulated excess toward the opposite end of said first compartment.

2. A transport-mixer as defined in claim 1 including means in operative association with said open screw conveyor for continuously recirculating the transferred materials in the said second compartment.

3. A transport-mixer according to claim 2 wherein the recirculating means comprises means for unloading the mixed materials from the said second compartment.

4. A transport-mixer according to claim 3 wherein the unloading and recirculating means comprises a discharge port in said second compartment fed by the open screw conveyor, a discharge duct connected with said port, and adjustable means for directing the discharge from said duct back into said second compartment and externally of said compartment selectively.

5. A transport-mixer as defined in claim 1 including means for continuously recirculating materials from said second compartment to said first compartment.

6. A transport-mixer as defined in claim 1 including means for continuously recirculating materials from said second compartment to one of said compartments.

7. A transport-mixer according to claim 1 wherein the means adjacent said port for retarding transfer through said port includes also devices for agitating the materials in the first compartment in the area adjacent the port in said partition.

8. A transport-mixer according to claim 7 wherein the retarding and agitating means comprises a vane in the helical channel of the open screw conveyor and in substantial part at least blocking said channel in the area adjacent the port in said partition.

9. A transport-mixer as defined in claim 1 wherein the means adjacent said port for retarding the transfer through said port consists of a constriction of said port so that its effective area is less than the effective cross-sectional area of said open screw conveyor and an interruption in the helical element of said screw conveyor at said port to accommodate the partition wall in the area of said restriction.

10. A transport-mixer as defined in claim 1 wherein the means adjacent said port for restricting the transfer through said port consists of an interruption in the helical fin of the screw conveyor in the area of the port in said partition.

11. Mixing apparatus comprising a hopper having a transverse partition dividing the interior of the hopper into first and second compartments, said partition having an opening therethrough constituting a discharge port for transfer of work material from said first compartment to said second compartment, and said second compartment having a discharge port to the outside of the hopper, an open screw conveyor operatively associated with said ports for discharge of said material therethrough, means adjacent the first of said ports for retarding the discharge through the first of said ports to a rate materially below the conveying capacity of the open screw conveyor so as to obtain a progressive buildup of material within said first compartment upwardly along that side of said partition facing said first compartment and above the first of said ports in excess of that passing through the first of said ports and resultant recirculation of the excess toward the opposite end of the first compartment, and means connected to the discharge port of the second compartment for continuously recirculating the materials discharged therethrough to one of said compartments.

References Cited in the file of this patent

UNITED STATES PATENTS

| | | |
|---|---|---|
| 32,276 | Wright | Sept. 10, 1861 |
| 1,563,101 | Offenhauser | Nov. 24, 1925 |
| 1,720,360 | Haines | July 9, 1929 |
| 1,763,121 | Bailey | June 10, 1930 |
| 2,101,490 | Bullock et al. | Dec. 7, 1937 |
| 2,576,177 | Herr | Nov. 27, 1951 |

FOREIGN PATENTS

| | | |
|---|---|---|
| 86,969 | Sweden | July 28, 1936 |